(12) United States Patent
Hahlweg et al.

(10) Patent No.: US 6,853,914 B2
(45) Date of Patent: Feb. 8, 2005

(54) DEVICE FOR GENERATING AND/OR PROCESSING NAVIGATIONAL INFORMATION

(75) Inventors: Cornelius Hahlweg, Hamburg (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/363,956

(22) PCT Filed: Sep. 1, 2001

(86) PCT No.: PCT/DE01/03362

§ 371 (c)(1),
(2), (4) Date: Jul. 16, 2003

(87) PCT Pub. No.: WO02/21079

PCT Pub. Date: Mar. 14, 2002

(65) Prior Publication Data

US 2004/0024521 A1 Feb. 5, 2004

(30) Foreign Application Priority Data

Sep. 7, 2000 (DE) ......................................... 100 44 123

(51) Int. Cl.⁷ ............................................. G01C 21/32
(52) U.S. Cl. .................................. 701/208; 340/995.18
(58) Field of Search .............................. 701/208, 200, 701/211; 340/995.18

(56) References Cited

U.S. PATENT DOCUMENTS

| 6,697,731 B2 | * | 2/2004 | Takayama et al. | .......... 701/200 |
| 2003/0023372 A1 | * | 1/2003 | Chon | .................. 701/211 |

FOREIGN PATENT DOCUMENTS

| EP | 0 654 775 | 5/1995 |
| EP | 0 932 134 | 7/1999 |

* cited by examiner

*Primary Examiner*—Marthe Y. Marc-Coleman
(74) *Attorney, Agent, or Firm*—Kenyon & Kenyon

(57) ABSTRACT

A device for generating and/or processing navigating data. The device having access to first location data, a first point and a second point being derivable with the aid of location data, navigational data being able to be generated and/or being processable for the points, and the second locations data being necessary for deriving the second point.

12 Claims, 2 Drawing Sheets

DEVICE FOR GENERATING AND/OR PROCESSING NAVIGATIONAL INFORMATION

FIELD OF THE INVENTION

The present invention relates to a device for generating and/or processing navigating data.

BACKGROUND INFORMATION

Devices for generating and/or processing navigating data include a database of a road network in the form of a digital map. Such devices perform position finding functions and/or navigating functions on such a database, for instance, for a motor vehicle.

SUMMARY OF THE INVENTION

The device according to the present invention may perform position finding functions and/or navigating functions using target points, i.e. geographical points which are not available in the database to which the device has access as a standard matter. The present invention may provide a broadening of the database in the form of second location data made available to the device. The second location data supplementing the first location data, for instance, by making available to the device additional geographical points or additional objects including geographical points, particularly POI's (points of interest) or entire map sections. It is only by the second location data that it is made possible for the device according to the present invention to use geographical points in a navigating task, which in the database, i.e. the first location data, were not regarded as being navigable.

The first location data may be a database which includes a road network at least partially. Thus, the present invention may be used even for first location data including road networks.

The second location data may be a broadening of the database. Thereby, due to the interplay of the first location data and the second location data, points may be navigably linked which, with regard to the first location data are either not present in the database at all or, if they are present, are not usable for navigation.

The second location data may include objects of any desired complexity. Thereby the device according to the present invention is very flexible with respect to the second location data which supplement the first location data. In particular, it is provided according to the present invention, to provide individual geographical points, whole traverses, i.e. sequences of geographical points, or even complete networks of geographical points, i.e. parts of maps, as second location data.

The first storage arrangement may be allocated to the device, and that the second location data are storable in the first storage arrangement. Thereby it is possible that the second location data are available in the device according to the present invention for any desired duration, for generating and/or processing navigating data. A renewed transmission of the second location data to the device according to the present invention therefore becomes superfluous, which reduces effort, cost and a possible restriction of the operating readiness of the device.

Moreover, the second point may be a point of entry into the sub-range of the road network represented by the first location data and/or an exit point from the sub-range of the road network represented by the first location data. Thereby is yielded a clear interface between the first and the second location data.

Furthermore, the second point may be used as intermediate target point for performing a navigation and/or a position finding. Thereby points become navigably linkable which, just on account of the database of the first location data, do not have this property.

After performing the navigation and/or position finding to the second point, a navigation and/or a position finding to a target point is performed. This makes possible a navigation and/or position finding between any points of the first and second location data.

The second location data (34) may represent at least the section traveled in the navigation and/or position finding between the second point and the target point. Thereby it is made possible only by the second location data to perform a navigation and/or a position finding between the second point and the target point.

The device may be associated with a man-machine interface, and that the reaching of the second point is able to be signaled at the man-machine interface. Thereby it is possible for a user of the device according to the present invention to comprehend the reaching of the interface between the first location data and the second location data.

The second storage arrangement may be allocated to the device, and that the first location data are storable in the second storage arrangement. This makes it possible for the device according to the present invention to receive a faster access to the first location data, which contributes to a faster processing and, going along with that, a greater comfort level of using the device according to the present invention.

In addition, the first location data and/or the second location data may be transmitted to the device in a wireless and/or wire-bound manner. Thus, the device according to the present invention is also usable independent of storage media in which data are stored in a non-changeable form, such as CD-ROM data carriers or the like. The data file to which the device according to the present invention has access may thus be constantly held current.

DETAILED DESCRIPTION

Figure 1:
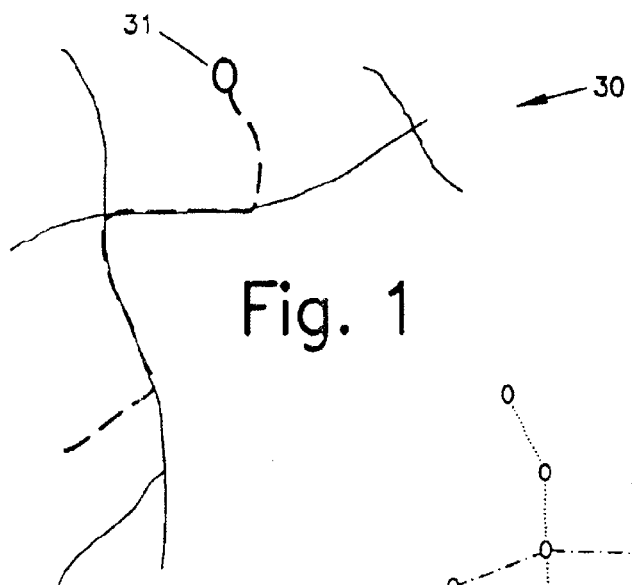
FIG. 1 shows an example of a road network including a target point.
Figure 4:
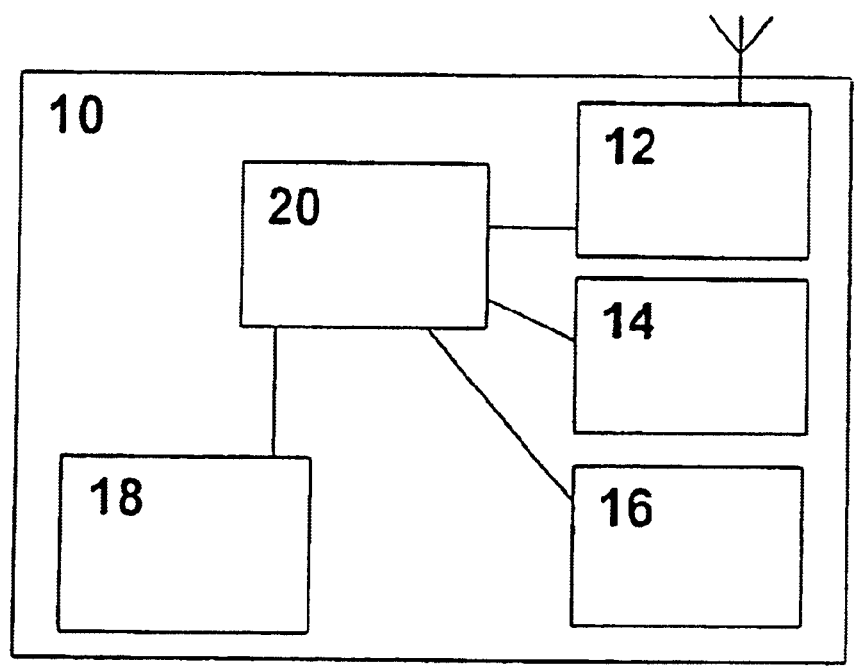
FIG. 4 shows a block diagram of the device according to the present invention.

FIG. 1 shows an example of a road network 30, with the aid of which a device 10 according to the present invention, further described in FIG. 4, and its functioning procedure. Road network 30 includes a target point 31, which is provided as a terminal point of a navigation function in the example embodiment. Instead of navigation, in the following, the concept of routing or navigation function is also used.

Figure 2:
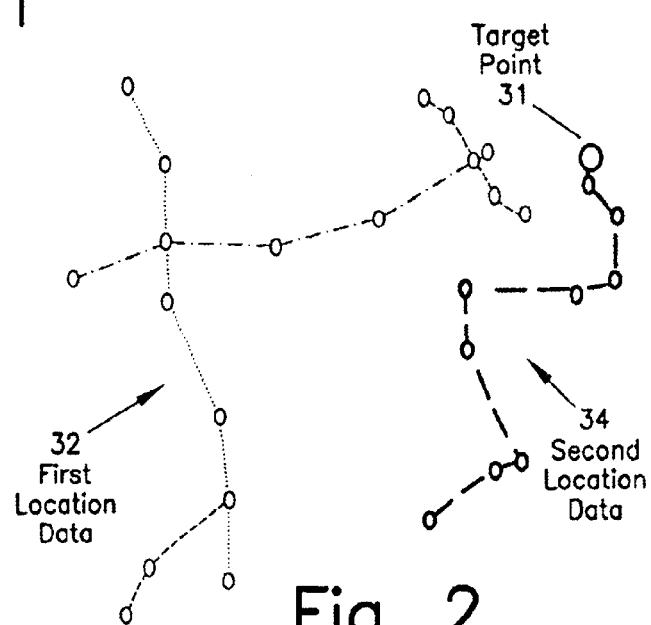
FIG. 2 shows an example of a representation of the road network in FIG. 1 in first and second location data.

In FIG. 2, first location data 32 and second location data 34 are shown in the form of sequences of points or in the form of networks of points. The first and the second location data 32, 34 together represent road network 30 of FIG. 1. In the example embodiment it is assumed that first location data 32 is a part of a database which road network 30 includes at least partially. The database is also denoted as digital map below. First location data 32 include the database or rather, the part of road network 30 representing it, in any desired form, such as in the form of traverses which are connected to one another at points of connection, or in the form of closed or open loops. Second location data 34 also include a representation of a sub-range of road network 30, first location data 32 and second location data 34, taken together, representing the entire road network 30 relevant to the example embodiment. In the example embodiment described, the circumstances are that second location data 34 include target point 31, which lies outside road network 30 represented by first location data 32.

Figure 3:
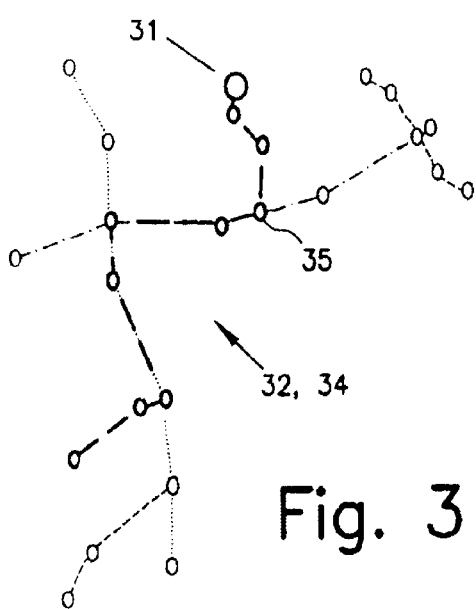
FIG. 3 shows the common representation of first and second location data as representation of the road network.

The digital map is shown in FIG. 3, and it comes about when first location data 32 and second location data 34 of the example embodiment are viewed in common. The entire road network 30, shown in FIG. 1 and relevant to the example embodiment, is then represented by location data 32; 34.

In FIG. 2 as well as in FIG. 3 points, especially geographical points, which are part of first location data 32 or part of second location data 34 are shown as symbols that are close to being circular. The points of first location data 32 and of second location data 34 are summarized as traverses in FIGS. 2 and 3. In each case, neighboring points on a traverse are connected by so-called edges, the edges in the drawings being shown as continuous or broken lines. In this context, traverses may cross one another, crossover points being able to be created which are a part of each of the crossing traverses, in general, in each case as points. Thus, first location data 32 may be regarded as digital representations of a sub-range of road network 30 in the form of traverses not described here. The edges of the first traverse of first location data 32 are shown as dotted lines in the example embodiment. The edges of the second traverse of first location data 32 are shown as dot-dash lines in the example embodiment. The edges of the third traverse of first location data 32 are shown as shorter dash lines in the example embodiment. The edges of the fourth traverse of first location data 32 are shown as longer dash lines in the example embodiment. The edges of the traverses of first location data 32 are shown in each case in non-bold lines. The second location data 34 include only one single traverse in the example embodiment, whose points and edges are shown in each case in bold lines.

It may be seen in FIG. 3 that second location data 34 partially overlap first location data 32. This is the case for a sub-range of the first traverse and the second traverse of first location data 32. Between target point 31 of second location data 34 and the overlapping range of location data 32, 34, first location data 32 and second location data 34 do not overlap. Due to the fact that first and second location data 32, 34 partially overlap and partially do not overlap, a second point 35 is defined which marks the transition between the overlapping range of first and second location data 32, 34 and the non-overlapping range of location data 32, 34. In the example embodiment, second point 35 is not a point of first location data 32, but lies on an edge between two points of the second traverse of first location data 32. Second point 35 is linked in a navigable manner into the representation of road network 30 only by the supplementation of first location data 32 by second location data 34, and the fact that second location data 34 include second point 35 not only as a part of an edge, but also as a point. In this connection, the qualification as navigable for a point means that, for such a point, navigating data are able to be created and/or are able to be processed. However, by the supplementation of first location data 32 by second location data 34, not only second point 35 becomes navigable but also target point 31.

Thus, a device 10 according to the present invention makes it possible that a database, to which device 10 has access, is supplemented in such a manner by second location data 34 that any points or map sections not included in the database, i.e. first location data 32, may be linked into the database in a navigable manner by second location data 34.

A device 10 according to the present invention is especially configured as a telematic terminal 10 or a navigation unit 10. Such units may include, or render access to their own database in the form of a digital map. In this context, such a database may be provided both in the form of the content of a storage medium such as a CD-ROM, and in the form of a central database in a data processing system of a service provider. In device 10 according to the present invention, or telematic unit 10 according to the present invention or navigation unit 10, the database in the form of first location data 32 may be supplemented or broadened by second location data 34 in the form of objects to be newly additionally loaded.

FIG. 4 shows the device according to the present invention as a block diagram. In this context, device 10 includes a control unit 20, which is connected to a first memory 14 as first storage arrangement 14, a second memory 16 as second storage arrangement 16 and a man-machine interface 18, respectively. Device 10 optionally includes a send/receive unit 12 for wireless or wire-bound data transmission. In second storage arrangement 16 first location data 32 are stored, in an example embodiment. Second location data 34 are stored in first storage arrangement 14. If a send/receive unit 12 is present, second location data 34 may be read in or broadened or modified, with the aid of a wire-bound or wireless transmission. For this purpose, send/receive unit 12 receives the changing or the supplementing data, and control unit 20 coordinates their storage in first storage arrangement 14. The second location data 34 may also be input to first storage arrangement 14, using a storage medium such as an updated CD-ROM. In the same manner, several possibilities come about for storing first location data 32 in second storage arrangement 16, for example, via send/receive unit 12 or, for instance, by inputting using storage media, or even by fixed hardware-type prestorage of a database in second storage arrangement 16. In this context, first and second storage arrangement 14, 16, depending on configuration, are provided as read-only memory, write-read memory in volatile or nonvolatile execution. The first and second storage arrangements 14, 16, in particular, may also be combined.

Device 10 communicates with a user with the aid of man-machine interface 18. In this connection, man-machine interface 18 may also be configured as an additional unit, such as an automobile radio, and device 10 according to the present invention only makes available the interface to the man-machine interface. For the execution of a navigating function, control unit 20 of device 10 according to the present invention links first location data 32 to second location data 34, in order, for example, to navigate the user to target point 31. To do this, control unit 20 naturally also processes the signals of sensors that are not shown, such as GPS sensors, acceleration sensors, milage sensor and more of the like. If, for example, at the beginning of the execution of the navigating function, the user is located at one of the end points of the second traverse of first location data 32 of the example embodiment, and he wants to navigate to target point 31, device 10 would automatically navigate the user first to second point 35, so as subsequently to process the partial traverse to target point 31. With respect to the sub-range of road network 30 represented by first location data 32, second point 35 is an exit point of such a navigating task: from second point 35 on, until target point 31, the user moves exclusively on points and traverses of second location data 34. If the navigating task were the opposite, that is, from target point 31 to get to an end point of the second traverse of first location data 32, second point 35 could correspondingly also be denoted as an entry point. In each case, however, second point 35 is utilized as the intermediate target for the guidance system or rather the navigation. Similarly, for position finding there is the possibility of utilizing second point 35 as the intermediate target. This makes second point 35 a navigably linked transition point between the originally present first location data 32 and the supplementing second location data 34.

This makes it possible, on the basis of conventional functionalities of autonomous navigating systems, to make available navigating devices which are provided for a dynamized navigation. Typical applications are:

navigating to a POI (point of interest) delivered by a service provider, supplementing sparsely drawn own maps by detailed map fragments obtained from a network or a data carrier, Fitting together map parts in edge areas and/or overlapping areas, e.g. in network-supported navigating systems, transition between map parts without their completely fitting together at all possible transitional points.

An scenario for the example embodiment described is that target point 31 denotes, for instance, a parking garage positioned inside a building complex and having its own drive. The own drive to the parking garage is not contained in the navigational database available to navigating device 10, by which, first of all, from the point of view of navigating device 10 it may not be controlled. From a service provider who is in possession of detailed (current) map material, at the request of the user of device 10 according to the present invention, information is now sent to this parking garage which corresponds to a request to second location data 34. Second location data 34 are fitted into the available database (first location data 32), especially with the aid of a map matching process. In this connection, second point 35 is defined as transitional point between first and the second location data 32, 34. Second point 35 is to be regarded as an intermediate target in order to navigate from any desired point of the "known" road network, that is, from any point of first location data 32 to target point 31. This intermediate target is used as the end point for the route calculation on the database originally present in the unit, that is, first location data 32. Upon reaching this intermediate target, position finding or navigating is continued by the part of road network 30 newly linked by second location data 34, until target point (31) (the parking garage) is reached.

According to the present invention, it is particularly provided that the transition between first location data 32 and second location data 34, i.e. the reaching of second point 35, is notified to the user via man-machine interface 18, particularly optically or acoustically. This may be used especially to ensure protection from misuse or faulty data quality on the part of the supplier of first location data 32.

What is claimed is:

1. A device for at least one of generating and processing navigating data, comprising:

an arrangement for accessing first location data;

an arrangement accessing second location data, the second location data being processable by the device;

an arrangement for deriving a first point and a second point in accordance with the first location data and the second location data, and an arrangement for at least one of generating and processing navigational data for the first point and the second point, wherein:

the first point and the second point are not part of the first location data, and the first location data and the second location data are linked, whereby at least one of the first point and the second point is navigably linked to the first location data.

2. The device of claim 1, wherein the first location data are stored in a database that includes a road network at least partially.

3. The device of claim 2, wherein the second location data are a broadening of the database.

4. The device of claim 2, wherein the second point includes at least one of:

a point of entry into a sub-range of the road network represented by the first location data, and an exit point from the sub-range of the road network represented by the first location data.

5. The device of claim 1, wherein the second location data include objects of any degree of complexity.

6. The device of claim 1, further comprising:

a first storage arrangement for storing the second location data.

7. The device of claim 6, further comprising:

a second storage arrangement for storing the first location data.

8. The device of claim 1, wherein the second point is used as an intermediate target point for performing at least one of a navigation finding and a position finding.

9. The device of claim 8, wherein after performing at least one of the navigation finding and the position finding, at least one of a second navigation finding and a second position finding to a target point is performed.

10. The device of claim 9, wherein the second location data represent at least a section traveled in the at least one of the navigation finding and the position finding between the second point and the target point.

11. The device of claim 1, wherein the device is associated with a man-machine interface and arrival at the second point is able to be signaled at the man-machine interface.

12. The device of claim 1, wherein at least one of the first location data and the second location data is transmittable to the device in at least one of a wireless manner and a wire-bound manner.

* * * * *